June 9, 1953  E. D. MEADOWS  2,641,517
PULLEY
Filed Jan. 3, 1949

INVENTOR
ERNEST D. MEADOWS
BY Mitchell Bechert
ATTORNEYS

Patented June 9, 1953

2,641,517

UNITED STATES PATENT OFFICE 2,641,517

PULLEY

Ernest D. Meadows, Atlanta, Ga., assignor to Meadows Manufacturing Company, Atlanta, Ga., a corporation of Georgia Application January 3, 1949, Serial No. 68,838

4 Claims. (Cl. 308—187)

My invention relates to lubricating means for a bearing, and in particular to lubricating means for the bearing means of an idler pulley, textile spindle, or the like.

It is an object of the invention to provide an improved device of the character indicated.

It is another object to provide an improved lubricating means, whereby there may be an automatic safety limit of lubricating pressure applied in lubricating the bearing.

It is a further object to provide an improved means for assuring a proper distribution of lubricant in a bearing of the character indicated.

Figure 1:
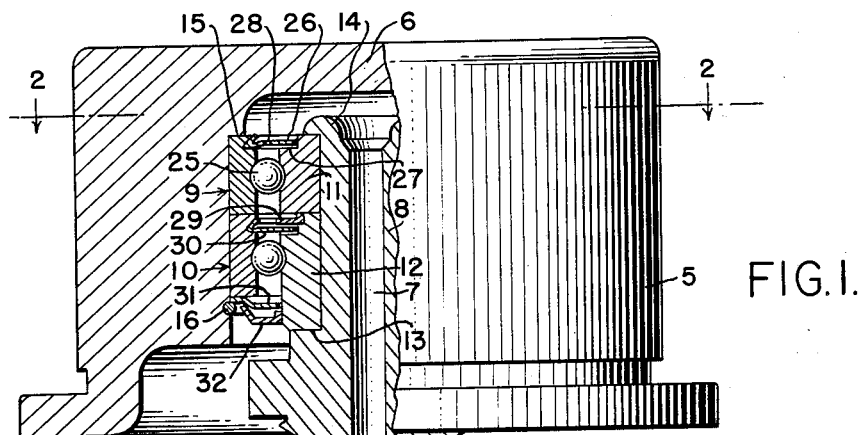
Figure 2:
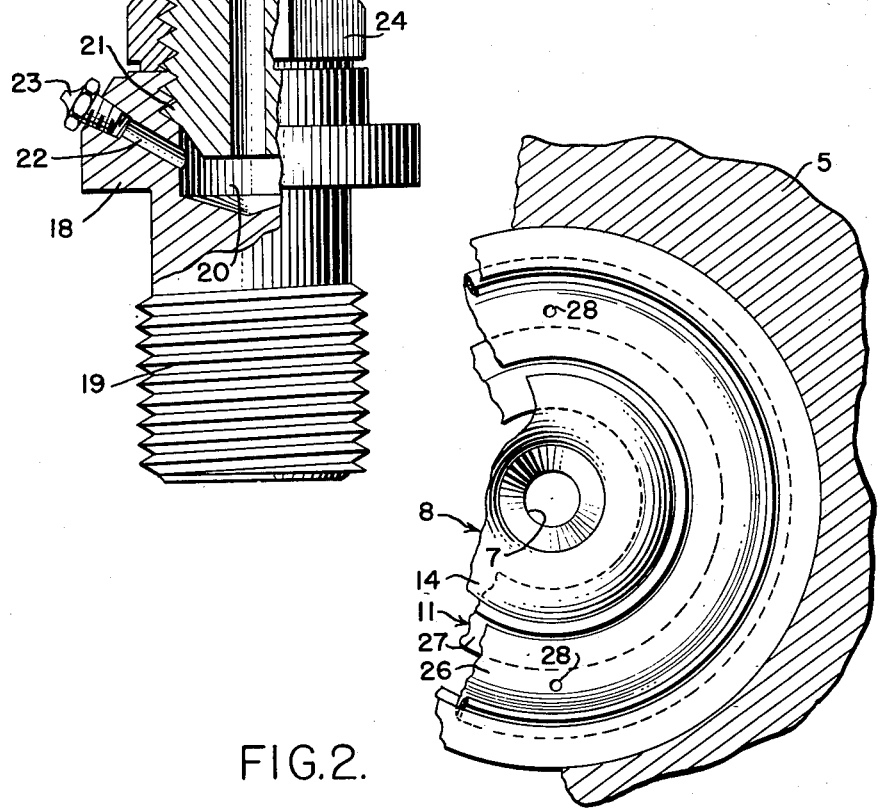

Other objects and various further features of the invention will be pointed out or will become apparent to those skilled in the art from a reading of the following specification in conjunction with the accompanying drawings. In said drawings, which show, for illustrative purposes only, a preferred form of the invention:

Fig. 1 is a view, partly in elevation and partly in section, of an idler pulley and a support therefor in accordance with the invention; and Fig. 2 is a sectional view of the arrangement of Fig. 1 taken substantially in the plane 2—2 of Fig. 1.

Briefly stated, my invention contemplates a safety means for automatically limiting the pressure and, therefore, the flow of lubricant to a bearing to be lubricated, thereby preventing an overlubrication of the bearing. The safety means contemplates a seal member extending between the relatively rotatable parts of the bearing in such a way as not normally to hamper the free relative rotation of these parts, but, nevertheless, in such relation as to prevent pressurized introduction of lubricant to the working parts of the bearing past the seal member. This prevention may be assured by direct sealing abutment of the seal member with relatively rotatable parts of the assembly so that, upon subsequent initial relative rotation of these parts, there may be a heating of the seal member due to friction. This heating may temporarily locally lower the viscosity of the grease or other lubricant so as to permit relatively limited introduction of lubricant to the working parts of the bearing; and such introduction may be via a relatively restricted opening or openings in the seal member, or via the opening constituting the normal free-running clearance between the seal member and relatively rotatable parts of the assembly. With such limited introduction of lubricant, the pressure on the lubricant will have been relieved, and the seal means need thereafter no longer frictionally engage one of the other of the relatively rotatable parts. Heating due to friction will stop, and the grease viscosity will no longer be favorable for introduction of lubricant to the bearing.

In the form to be described, an idler with a closed side is supported on a central stud by means of antifriction bearings, and a lubrication passage in the stud opens to a closed chamber, defined by the closed side of the pulley. The seal member is supported between the antifriction bearing means and the open end of the stud, so as to limit the amount of lubricant that may be fed at any one time to the bearing means via the lubricant passage in the stud.

Referring to the drawings, my invention is shown in application to the vertical mounting of a textile-type idler pulley 5. The pulley 5 may have a closed side 6 overstanding the open end of a lubricating passage 7 in a supporting stud 8. The pulley 5 may be revolubly carried by the stud 8 on antifriction bearing means, and, in the form shown, I have employed two single-row bearings 9—10. The inner rings 11—12 of these bearings may be mutually abutting and seated against a shoulder 13 on the supporting stud 8; and the assembly may be retained by staking, swaging, or otherwise deforming the upper lip of the stud 8, as at 14. The outer rings of the bearings 9—10 may likewise be mutually abutting; the outer rings may be seated at one end against a shoulder 15 on the pulley 5 and retained at the other end, as by means of a snap ring 16 seated within an annular groove in the bore of the pulley 5.

The supported end of the stud 8 may include means for mounting to a frame, spinning rail or the like, and it may further include means for the pressurized introduction of grease or other lubricant to the passage 7. In the form shown, the supported end of the stud 8 is formed essentially of two parts. As a first part, a bolt or base member 18 may include a threaded shank 19 for mounting to the frame or rail. The base member 18 may be bored, as at 20, and internally threaded to accommodate the threaded lower end 21 of the stud 8. The stud 8 is preferably threaded only part way in the bore 20 of the base member, so that at the lower end of the bore 20 there may be a more or less open space for the supply of lubricant to the passage 7. A generally radially extending passage 22 may communicate with this lower end of the bore 20, and a grease or other lubricant fitting 23 may be provided at the outer end of the passage 22. Locknut means 24 may serve permanently to anchor the stud 8 in the base member 18.

In accordance with the invention, I provide a novel flow-limiting seal means between the antifriction elements 25 of the bearing 9 and the upper or lubricating end of the passage 7. Such seal means may be carried wholly with the assembly of the bearing 9. In the form shown this seal means is but a single shield member 26 seated in a recessed groove in the outer ring of bearing 9 and extending generally radially inwardly into free-running relation with the other bearing ring 11. The unsupported edge or part of the seal member 26 preferably overstands a face of the inner bearing ring 11, and in the form shown the inner bearing ring 11 includes a radial shoulder 27 over which the ring 26 may run freely.

The seal ring 26 is preferably resilient and may be formed by stamping from a thin steel sheet. The ring 26 may be continuous throughout, or, as in the form shown, it may include a relatively restricted opening 28 communicating between the closed space at the upper end of the lubricating passage 7 and the antifriction elements 25; I have shown two such relatively restricted openings 28 (see Fig. 2) in the seal ring 26. If desired, further seal means may be provided for other parts of the bearings 9—10, and in the form shown a labyrinth is provided between the bearings 9—10 in the form of a first radial disc 29 on the inner ring 12 and a second radial disc 30 on the outer ring of bearing 10. This labyrinth 29—30 will be understood to permit a certain flow of lubricant to the lower bearing 10, while retaining a desired quantity for the upper bearing 9. At the lower end of the assembly there may be a dust-trap and dirty-grease-retaining type of seal including a first radially inwardly extending member 31 retained between the snap ring 16 and the outer bearing rings, and an annularly cupped trap or seal member 32 frictionally seated on the lower projecting part of the inner bearing ring 12.

In operation, grease or other lubricant may be applied by a gun or other means at the fitting 23, and in the first lubrication air within the passages 22 and 7 and in the space under the closed side 6 of the pulley 5 may be displaced freely by the lubricant that is being introduced. However, as soon as the lubricant strikes the first seal means 26, such seal means may be deformed into lubricant-sealing relation over the shoulder surface 27 so that the only possible passage for lubricant may be the relatively restricted openings 28. Such openings 28 are preferably so restricted (depending upon the viscosity of the lubricant) that negligible quantities of lubricant will pass therethrough when grease pressure is applied. The result will then be a flow stoppage, which the maintenance man may readily detect by his inability to force the introduction of further lubricant. Upon starting rotation of the pulley, the lubricant may still be under pressure so as to initially maintain a frictional engagement of the seal ring 26 with the shoulder 27; this engagement may be such as to produce a localized heating of the lubricant in the vicinity of the seal means 26. Such localized heating may locally reduce the viscosity of the lubricant to an extent permitting a limited flow through the openings 28. Upon such flow the lubricant pressure may be reduced, and the seal means 26 may resiliently resume its intended free-running relation with respect to the shoulder 27 of the inner bearing ring 11. In a subsequent servicing of the assembly, it will be understood that a relatively small quantity of additional lubricant will be admitted, and that again the maintenance man may readily detect the limit of lubrication.

I have indicated above that, if desired, the seal member 26 may be continuous, that is, that it need have no openings 28. In such case, the effective opening which may permit the desired limited greasing will be the normal clearance (axially extending and annular) between the adjacent relatively rotating free-running surfaces of seal 26 and shoulder 27. Without an opening 28, a seal member 26 may have sufficient resiliency in relation to the viscosity of the grease to flex under pressure into sealing relation with shoulder 27, but resiliently to resume the free-running relation when enough local heating has taken place to relieve lubricant pressure, as will be clear.

It will be seen that I have described a relatively simple means for assuring a proper lubrication of an antifriction bearing regardless of abuse or lack of care in applying lubricating pressure. With my arrangement the maintenance man will be encouraged to force as great a lubricant pressure as he can, but still there need be only the desired relatively slight amount of lubricant actually introduced to the running parts of the bearing. It will be noted that this desired result may be achieved without any impairment of the normal free-running relation of the bearing.

While I have described my invention in detail for the preferred form shown, it will be understood that modifications may be made within the scope of the invention as defined in the appended claims.

I claim:

1. In a device of the character indicated, a central supporting member having a central lubricating passage therein, antifriction-bearing means including a first race ring supported by said support member, means to be rotated upon said support member and carrying a second race ring of said antifriction bearing means, one of said support means and of said rotatable means effectively closing-off an end of said antifriction bearing means with said passage in communication with the space within said closed-off end, and seal means for said end of said antifriction-bearing means, said seal means having a relatively restricted opening communicating between said passage and the inside of said antifriction-bearing means, the contacting cooperating parts of said bearing means being wholly on the axial side of said seal means away from said closed end, whereby said seal means may serve to guard against excessive application of lubricant to said bearing means via said passage.

2. In an idler-pulley assembly, mounting means including a central stud member with a longitudinally extending grease-lubricating passage therein, means for supplying grease under pressure at the support end of said passage, the other end of said passage being open, a pulley member having a closed side, and antifriction bearing means between said stud member and said pulley member with the closed side of said pulley member overstanding the open end of said passage, and deformable seal means carried by one of said members between the open end of said passage and the antifriction elements of said bearing means and extending into overlapping but free-running relation with the other of said members, for the purpose described.

3. In a device of the character indicated, a member to be rotated and having a bore with a closed side, central supporting means for said member, and antifriction bearing means between said supporting means and said bore; said supporting means including a base member to be secured to a support, and a further member supporting said bearing means and carried by said base member, said further member having a through generally longitudinally extending internal passage communicating at one end with said bore and facing said closed side and communicating at the other end with said base member, and said base member having an externally accessible passage communicating with said generally longitudinally extending passage.

4. In an idler-pulley construction, a pulley body member, a support member therefor, one of said members having a centrally disposed axial bore, the other of said members having a bearing part extending into said bore, one of said members having a passage for the introduction of lubricant into said bore, anti-friction bearing means between said bore and said bearing part and including outer race means fitting said bore and inner race means on said bearing part with anti-friction bearing elements between the respective race means, said anti-friction bearing means together with the bottom of said bore and the end of said bearing part defining a substantial lubricant chamber wholly at one side of said anti-friction bearing means, and a plate seal carried with one of said members and positioned in running clearance relation with the other, said plate seal being flexible and in overlapping relation to said other member whereby pressure of lubricant in said lubricant chamber will flex said plate seal into sealing engagement with said other member to hold back a flood of lubricant to said bearing means, said seal means having limited lubricant passage means to conduct a limited supply of lubricant to said anti-friction elements.

ERNEST D. MEADOWS.

References Cited in the file of this patent

UNITED STATES PATENTS

| Number | Name | Date |
|---|---|---|
| 1,398,936 | Bayrer | Nov. 29, 1921 |
| 1,903,217 | Hodge | Mar. 28, 1933 |
| 2,272,554 | Gilbert | Feb. 10, 1942 |
| 2,272,757 | Teker | Feb. 10, 1942 |